(12) United States Patent
Shanmuga Vadivel

(10) Patent No.: US 11,954,826 B2
(45) Date of Patent: Apr. 9, 2024

(54) LOSSLESS REPRESENTATION OF HIGH DYNAMIC RANGE (HDR) IMAGES FOR NEURAL NETWORK INFERENCING

(71) Applicant: Synaptics Incorporated, San Jose, CA (US)

(72) Inventor: Karthikeyan Shanmuga Vadivel, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 358 days.

(21) Appl. No.: 17/381,903

(22) Filed: Jul. 21, 2021

(65) Prior Publication Data

US 2023/0031349 A1 Feb. 2, 2023

(51) Int. Cl.

| G06T 5/00 | (2006.01) |
|---|---|
| G06N 3/04 | (2023.01) |
| G06N 3/08 | (2023.01) |
| G06T 1/20 | (2006.01) |
| G06T 3/40 | (2006.01) |
| G06T 3/4053 | (2024.01) |
| H04N 23/80 | (2023.01) |

(52) U.S. Cl.
CPC ............... *G06T 5/002* (2013.01); *G06N 3/04* (2013.01); *G06N 3/08* (2013.01); *G06T 1/20* (2013.01); *G06T 3/4053* (2013.01); *G06T 2207/20021* (2013.01); *G06T 2207/20081* (2013.01); *G06T 2207/20084* (2013.01); *G06T 2207/20208* (2013.01); *H04N 23/80* (2023.01)

(58) Field of Classification Search
CPC ......... G06T 5/002; G06T 1/20; G06T 3/4053; G06T 2207/20021; G06T 2207/20081; G06T 2207/20084; G06T 2207/20208; G06N 3/04; G06N 3/08; H04N 23/80
See application file for complete search history.

(56) References Cited

U.S. PATENT DOCUMENTS

| 2014/0022268 A1* | 1/2014 | Lee ........................... G06T 1/20 345/522 |
| 2020/0307584 A1* | 10/2020 | Yashiro .................. B60W 10/11 |

* cited by examiner

*Primary Examiner* — David F Dunphy
(74) *Attorney, Agent, or Firm* — Paradice & Li LLP

(57) ABSTRACT

This disclosure provides methods, devices, and systems for neural network inferencing. The present implementations more specifically relate to performing inferencing operations on high dynamic range (HDR) image data in a lossless manner. In some aspects, a machine learning system may receive a number (K) of bits of pixel data associated with an input image and subdivide the K bits into a number (M) of partitions based on a number (N) of bits in each operand operated on by an artificial intelligence (AI) accelerator, where N<K. For example, the K bits may represent a pixel value associated with the input image. In some implementations, the AI accelerator may perform an inferencing operation based on a neural network by processing the M partitions, in parallel, as data associated with M channels, respectively, of the input image.

20 Claims, 8 Drawing Sheets

LOSSLESS REPRESENTATION OF HIGH DYNAMIC RANGE (HDR) IMAGES FOR NEURAL NETWORK INFERENCING

TECHNICAL FIELD

The present implementations relate generally to neural networks, and specifically to lossless representations of high dynamic range (HDR) images for neural network inferencing.

BACKGROUND OF RELATED ART

Machine learning is a technique for improving the ability of a computer system or application to perform a certain task. Machine learning can be broken down into two component parts: training and inferencing. During the training phase, a machine learning system may be provided with one or more "answers" and one or more sets of raw data to be mapped to each answer. The machine learning system may perform statistical analysis on the raw data to "learn" or model a set of rules (such as a common set of features) that can be used to describe or reproduce the answer. Deep learning is a particular form of machine learning in which the model being trained is a multi-layer "neural network." During the inferencing phase, the machine learning system may apply the rules to new data to generate answers or inferences about the data.

The training phase is generally performed using specialized hardware that operates on floating-point precision input data. By contrast, the inferencing phase is often performed on edge devices with limited hardware resources (such as limited processor bandwidth, memory, or power). For example, to increase the speed and efficiency of inferencing operations, many edge devices implement artificial intelligence (AI) accelerators (also referred to as AI processors) that are specifically designed to handle highly parallelized low-precision computations. Such AI accelerators may include arithmetic logic units (ALUs) that can be configured to operate on operands of limited size.

Some edge devices may be configured to perform inferencing operations on high dynamic range (HDR) images. Each pixel value associated with an HDR image may be 24 bits in length. However, many AI accelerators can only operate on 8-bit operands. As such, each unit of raw input data associated with an HDR image may be larger than the operand size supported by an AI accelerator. Thus, to perform inferencing operations on HDR images, some edge devices may quantize each 24-bit pixel value to an 8-bit value, which results in a loss of information or precision in the input data. Such losses of information may lead to inaccurate inferencing results, for example, in the form of noise or other errors.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of inferencing by a machine learning system. The method includes steps of receiving a number (K) of bits of pixel data associated with an input image; subdividing the K bits into a number (M) of partitions based on a number (N) of bits in each operand operated on by an artificial intelligence (AI) accelerator, where N<K, and where the AI accelerator is configured to process the M partitions, in parallel, as data associated with M channels, respectively, of the input image; and performing an inferencing operation associated with the input image based at least in part on the AI accelerator processing the M partitions.

Another innovative aspect of the subject matter of this disclosure can be implemented in a machine learning system that includes an AI accelerator and bit partitioning circuitry. The AI accelerator is configured to perform an inferencing operation associated with an input image. The bit partitioning circuitry is configured to receive a number (K) of bits of pixel data associated with the input image; and subdivide the K bits into a number (M) of partitions based on a number (N) of bits in each operand operated on by the AI accelerator, where N<K, and where the AI accelerator is configured to process the M partitions, in parallel, as data associated with M channels, respectively, of the input image and perform the inferencing operation based at least in part on the processing of the M partitions.

Another innovative aspect of the subject matter of this disclosure can be implemented in a method of training a neural network. The method includes steps of receiving a number (K) of bits of pixel data associated with an input image depicting a scene; receiving a representative image of the scene; subdividing the K bits into a number (M) of partitions based on a number (N) of bits in each operand operated on by an AI accelerator configured for inferencing based on the neural network, where N<K; and training the neural network to process the M partitions, in parallel, as data associated with M channels, respectively, of the input image and to reproduce the representative image based at least in part on the processing of the M partitions.

BRIEF DESCRIPTION OF THE DRAWINGS

The present implementations are illustrated by way of example and are not intended to be limited by the figures of the accompanying drawings.

DETAILED DESCRIPTION

Figure 1:
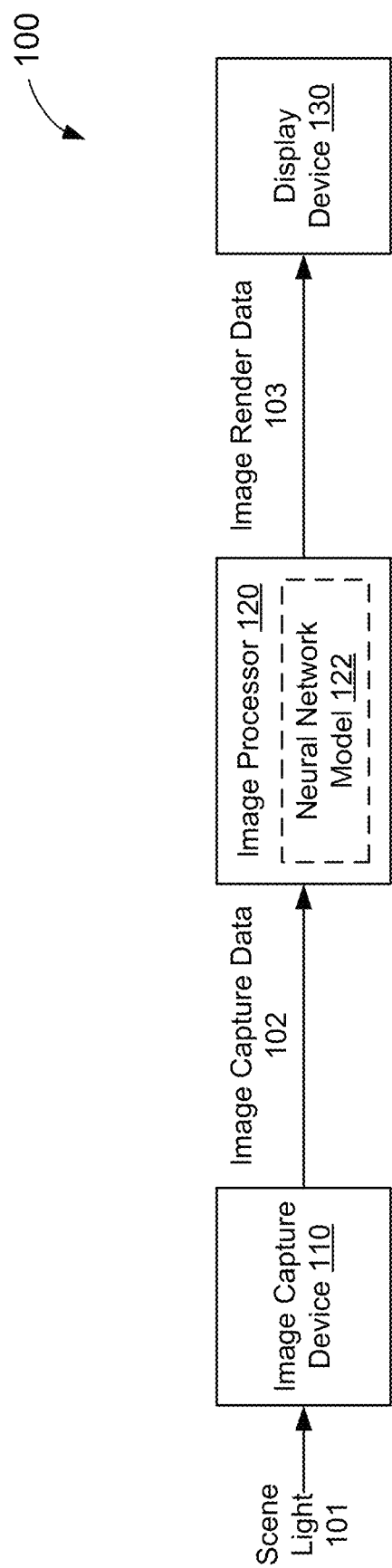
FIG. 1 shows a block diagram of an example image capture and display system, according to some implementations.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

Various aspects relate generally to machine learning and, more particularly, to performing inferencing operations on high dynamic range (HDR) image data in a lossless manner. In some aspects, a machine learning system may receive a number (K) of bits of pixel data associated with an input image and subdivide the K bits into a number (M) of partitions based on a number (N) of bits in each operand operated on by an artificial intelligence (AI) accelerator, where N<K. For example, the K bits may represent a pixel value associated with the input image. In some aspects, each of the M partitions may include at most N bits of pixel data, where $$M = \left\lceil \frac{N}{K} \right\rceil.$$

In some implementations, the AI accelerator may perform an inferencing operation based on a neural network by processing the M partitions, in parallel, as data associated with M channels, respectively, of the input image.

Particular implementations of the subject matter described in this disclosure can be implemented to realize one or more of the following potential advantages. Aspects of the present disclosure may improve the precision and accuracy of inferencing operations performed by an edge device on HDR image data. As described above, many edge devices implement AI accelerators that are designed to operate on operands of limited size for faster inferencing. However, the size of each unit of raw input data associated with an HDR image may far exceed the operand size supported by such AI accelerators. By partitioning each unit of raw input data across multiple channels that can be processed in parallel by an AI accelerator, aspects of the present disclosure allow edge devices to perform inferencing operations on HDR image data without loss of information or precision.

FIG. 1 shows a block diagram of an example image capture and display system 100, according to some implementations. The system 100 includes an image capture device 110, an image processor 120, and a display device 130. The image capture device 110 (such as a camera) captures a pattern of light 101 from a scene and converts the light 101 to digital image capture data 102. The image capture data 102 may include an array of pixels (or pixel values) representing a digital image of the scene. In some aspects, the image capture device 110 may capture a sequence of image capture data 102 representing a sequence of frames of video content. The display device 130 (such as a television, computer monitor, smartphone, or any other device that includes an electronic display) renders or displays the digital image by reproducing the light pattern on an associated display surface. Although depicted as an independent block in FIG. 1, in actual implementations the image processor 120 may be incorporated or otherwise included in the image capture device 110, the display device 130, or a combination thereof.

The image processor 120 converts the image capture data 102 to image render data 103 that more accurately reflects the original scene captured by the image capture device 110. For example, the original scene may be more accurately reproduced on the display device 130 using the image render data 103 than the image capture data 102. In some implementations, the image processor 120 may be configured to correct various pixel distortions in the image capture data 102 to improve the quality of the digital image. Example pixel distortions include, but are not limited to, vignetting, aberration, and noise. In some other implementations, the image processor 120 may be configured to change a resolution of the image capture data 102 based on the capabilities of the display device 130. For example, the image render data 103 may be a super-resolution (SR) image or an upconverted image that is scaled to match a resolution of the display device 130.

In some implementations, the image processor 120 may generate the image render data 103 based, at least in part, on a neural network model 122 that is trained through machine learning. Machine learning is a technique for improving the ability of a computer system or application to perform a certain task. During a training phase, a machine learning system may be provided with multiple "answers" and one or more sets of raw data to be mapped to each answer. For example, a machine learning system may be trained to perform a denoising operation on a low-light image by providing the system with a large number of short-exposure images captured of a scene under low light conditions (which represents the raw data) and one or more representative images of the same scene that contain little or no noise (which represents the answer). The machine learning system may then perform statistical analysis on the raw data to determine a common set of features (also referred to as "rules") that can be associated with noise.

Deep learning is a particular form of machine learning in which the model being trained is a multi-layer neural network. Deep learning architectures are often referred to as artificial neural networks due to the way in which information is processed (similar to a biological nervous system). For example, each layer of the deep learning architecture may be composed of a number of artificial neurons. The neurons may be interconnected across the various layers so that input data (such as the raw data) may be passed from one layer to another. More specifically, each layer of neurons may perform a different type of transformation on the input data that will ultimately result in a desired output (such as a denoised image). The interconnected framework of neurons may be referred to as a neural network model. Thus, in some implementations, the neural network model 122 may represent a set of rules that can be used to "infer" denoised representations of low-light images.

Figure 2:
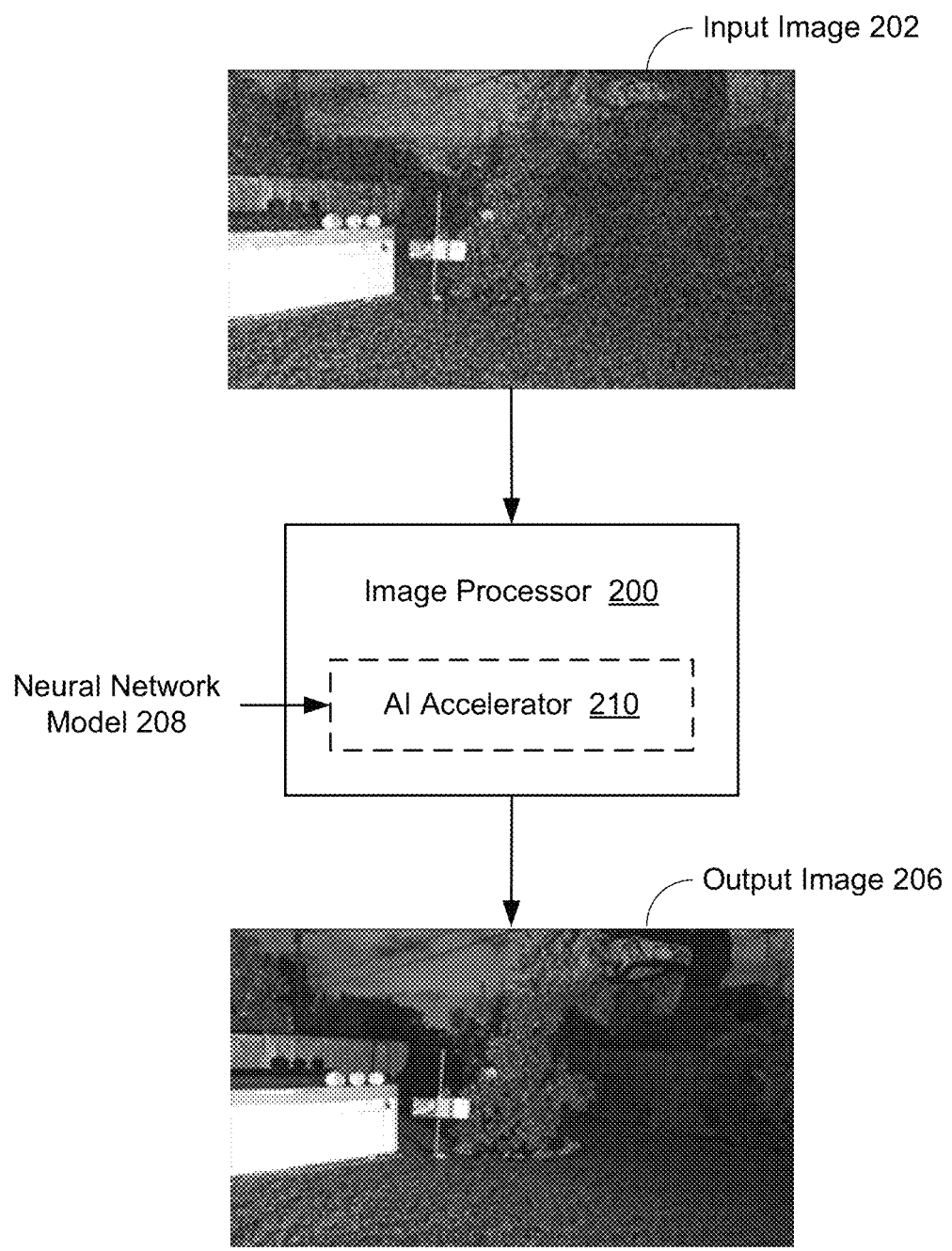
FIG. 2 shows a block diagram of an example image processor, according to some implementations.

FIG. 2 shows a block diagram of an example image processor 200, according to some implementations. In some implementations, the image processor 200 may be one example of the image processor 120 of FIG. 1. Thus, the image processor 200 may be configured to receive an input image 202 and infer an output image 206 based on the input image 202. For example, the input image 202 may be associated with the image capture data 102 and the output image 206 may be associated with the image render data 103.

In some implementations, the image processor 200 may generate the output image 206 by performing a denoising operation on the input image 202 that reduces the amount of noise associated therewith. In the example of FIG. 2, the input image 202 depicts a scene captured by an image capture device (such as the image capture device 110) in low-light conditions. As a result, the scene depicted in the image 202 appears noisy or grainy. For example, the distribution of pixels in the image 202 contains "spikes" in brightness and color (such as dark pixels in bright regions of the scene and bright pixels in dark regions of the scene). In contrast, the color and brightness of pixels in the output image 206 follow a substantially smooth distribution. For example, dark regions of the scene appear dark and bright regions of the scene appear bright in the output image 206.

In some implementations, the image processor 200 may include an AI accelerator 210. The AI accelerator 210 may include one or more processors that are configured to accelerate neural network inferencing. For example, the hardware architecture of the AI accelerator 210 may be designed to handle highly parallelized low-precision computations. As such, the AI accelerator 210 may traverse neural networks more quickly or efficiently than a general-purpose processor. The AI accelerator 210 may implement a neural network based on a neural network model 208. With reference for example to FIG. 1, the neural network model 208 may be one example of the neural network model 122. In some implementations, the AI accelerator 210 may infer the output image 206 based, at least in part, on the input image 202. For example, the neural network model 208 may represent a set of rules that can be used to infer a denoised representation of a low-light image.

The AI accelerator 210 may produce the output image 206 by adjusting the values of one or more pixels associated with the input image 202. As such, a pixel value represents the smallest unit of raw input data that can be operated on by the AI accelerator 210. In some implementations, the number (K) of bits in each pixel value associated with the input image 202 may be larger than the number (N) of bits in each operand that can be operated on by the AI accelerator 210 (K>N). For example, to increase the speed and efficiency of inferencing on an edge device, the AI accelerator 210 may be configured to operate only on 8-bit operands (N=8). However, in some aspects, the input image may conform to an HDR image format. As such, the size of each pixel value associated with the input image 202 may be substantially greater than 8 bits. For example, an HDR pixel value may be represented by 12, 16, or 24 bits (K=12, 16, or 24).

In some aspects, the image processor 200 may convert each K-bit pixel value to one or more N-bit inputs that can be operated on by the AI accelerator 210. In some implementations, each K-bit pixel value may be quantized as a respective N-bit value. Quantization reduces the number of bits that are used to represent each pixel of the input image 202, which results in a loss of information or precision at the inputs of the AI accelerator 210. For example, each 24-bit raw pixel value associated with an HDR image may be reduced to a respective 8-bit quantized value for inferencing by the AI accelerator 210. As described above, such losses in information may lead to inaccurate inferencing results. For example, the output image 206 may include a substantial amount of residual noise due to quantization errors in the inputs to the AI accelerator 210.

On the other hand, aspects of the present disclosure recognize that image data can be encoded in multiple channels. Each channel carries data associated with a respective component of the input image. For example, each image data can be encoded into red (R), green (G), and blue (B) color channels. As such, each pixel of the input image can be represented by a respective R pixel value (in the R color channel), a respective G pixel value (in the G color channel), and a respective B pixel value (in the B color channel). Each pixel value indicates the brightness of a respective color component for that pixel. Thus, each color channel contains a grayscale representation of the input image with respect to a particular color filter. Aspects of the present disclosure further recognize that, because a pixel value describes a particular component of a respective pixel, each pixel value belonging to a given channel can be processed as an individual unit of input data by the AI accelerator 210.

Thus, in some other implementations, each K-bit pixel value may be subdivided into a number (M) of partitions, where each partition is associated with a respective channel of the input image 202. More specifically, each of the M partitions may include at most N bits of pixel data so that $$M = \left\lceil \frac{N}{K} \right\rceil.$$

For example, a 24-bit pixel value may be subdivided into three 8-bit partitions (M=3) associated with three channels, respectively, of the input image 202. A first channel may include the 8 most significant bits, or most significant byte (MSB), of each pixel value associated with the input image 202, a second channel may include the middle 8 bits of each pixel value associated with the input image 202, and a third channel may include the 8 least significant bits, or least significant byte (LSB), of each pixel value associated with the input image 202. Because the size of each partition is equal to the operand size (N) of the AI accelerator 210, and because each partition represents data associated with a respective channel of the input image 202, the AI accelerator 210 can operate on the M partitions in parallel.

Thus, by subdividing each K-bit pixel value into M partitions, the AI accelerator 210 can process each pixel of an HDR image without loss of information or precision. More specifically, such partitioning allows the AI accelerator 210 to operate on all K bits of each pixel value. As a result, the AI accelerator 210 may perform inferencing operations with greater accuracy and precision than would otherwise be possible with quantized input data. For example, allowing the AI processor 210 to operate on all K bits of each pixel value (rather than an N-bit quantized value) may reduce the amount of residual noise in the output image 206. Although described in the context of denoising operations performed on HDR images, the present implementations may be suitable for various other applications. Example suitable applications may include, but are not limited to, super-resolution (SR) imaging and various other inferencing operations for which a raw unit of input data may be larger than the operand size of the AI accelerator 210.

Figure 3:
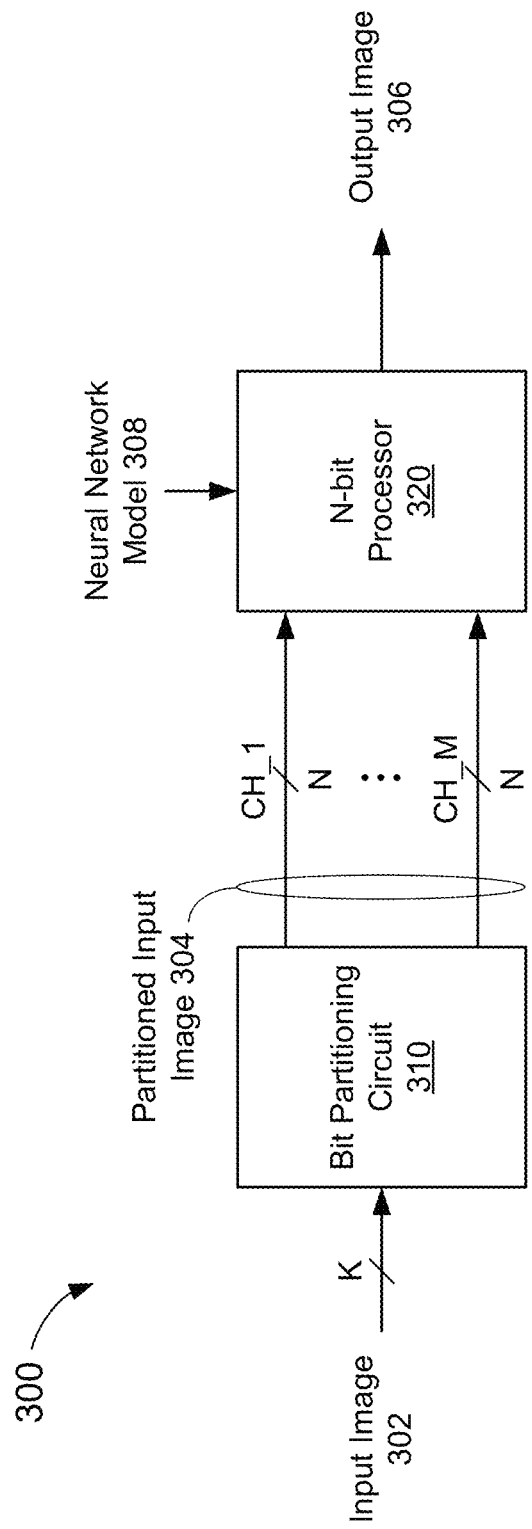
FIG. 3 shows a block diagram of an example machine learning system, according to some implementations.

FIG. 3 shows a block diagram of an example machine learning system 300, according to some implementations. In some implementations, the machine learning system 300 may be one example of the image processor 200 of FIG. 2. For example, the machine learning system 300 may be configured to infer an output image 306, from an input image 302, based on a neural network model 308. In some implementations, the machine learning system 300 may perform such inferencing in a lossless manner so that each bit of the input image 302 is processed in accordance with the neural network model 308.

The machine learning system 300 includes a bit partitioning circuit 310 and an N-bit processor 320. In some implementations, the N-bit processor 320 may be configured to implement the neural network model 308 to perform an inferencing operation that produces the output image 306 based, at least in part, on the input image 302. Example inferencing operations may include, but are not limited to, denoising operations and SR imaging operations. With reference for example to FIG. 2, the N-bit processor 320 may be an example implementation of the AI accelerator 210. More specifically, the N-bit processor 320 may only be capable of processing units of data that are N bits in size. For example, the N-bit processor 320 may include one or more registers, data buses, or arithmetic logic units (ALUs) that are configured to store, transfer, or operate on N-bit operands. In some implementations, the N-bit processor 320 may be an 8-bit processor (N=8).

In some aspects, each raw pixel value associated with the input image 302 may be represented by a number (K) of bits, where K>N. For example, the input image 302 may be an HDR image having raw pixel values that are 12, 16, or 24 bits in length. In some implementations, the bit partitioning circuit 310 may be configured to partition the input image 302 across a number (M) of channels CH_1-CH_M, where $$M = \left\lceil \frac{N}{K} \right\rceil.$$

More specifically, the bit partitioning circuit 310 may subdivide each pixel value associated with the input image 302 into M partitions so that each partition coincides with a respective one of the channels CH_1-CH_M. In other words, each of the channels CH_1-CH_M may include a respective subset of the bits in each K-bit pixel value associated with the input image 302. For example, the first channel CH_1 may include the MSB of the pixel values and the $M^{th}$ channel CH_M may include the LSB of the pixel values. Thus, the M channels of pixel data collectively represent a partitioned input image 304.

Figure 4A:
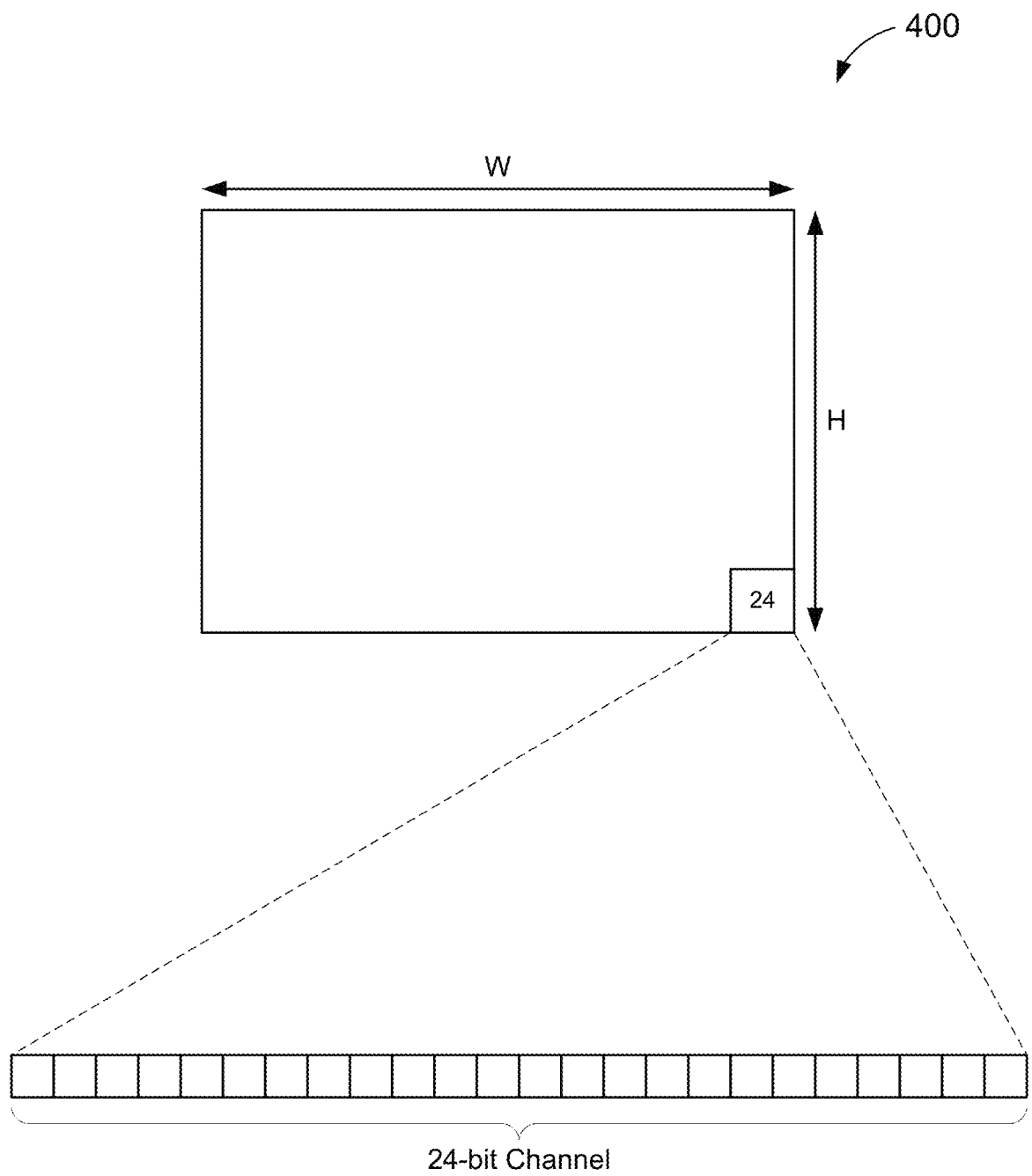
FIG. 4A shows an example input image formed by an array of pixel values.

FIG. 4A shows an example input image 400 formed by an array of pixel values. In some implementations, the input image 400 may be one example of the input image 302 received by the bit partitioning circuit 310. As shown in FIG. 4A, the input image 400 has a height (H) and a width (W).

Each pixel value associated with the input image 400 is 24 bits in length (K=24). For simplicity, only a single channel of data is depicted in the example of FIG. 4A. As such, each pixel value associated with the input image 400 may belong to the same 24-bit channel. However, in actual implementations, the 24-bit channel may be one of multiple channels of data associated with the input image 400. For example, the 24-bit channel may represent a particular color channel of the input image 400 (such as R, G, or B). Thus, the input image 400 may include one or more additional color channels (not shown for simplicity).

Figure 4B:
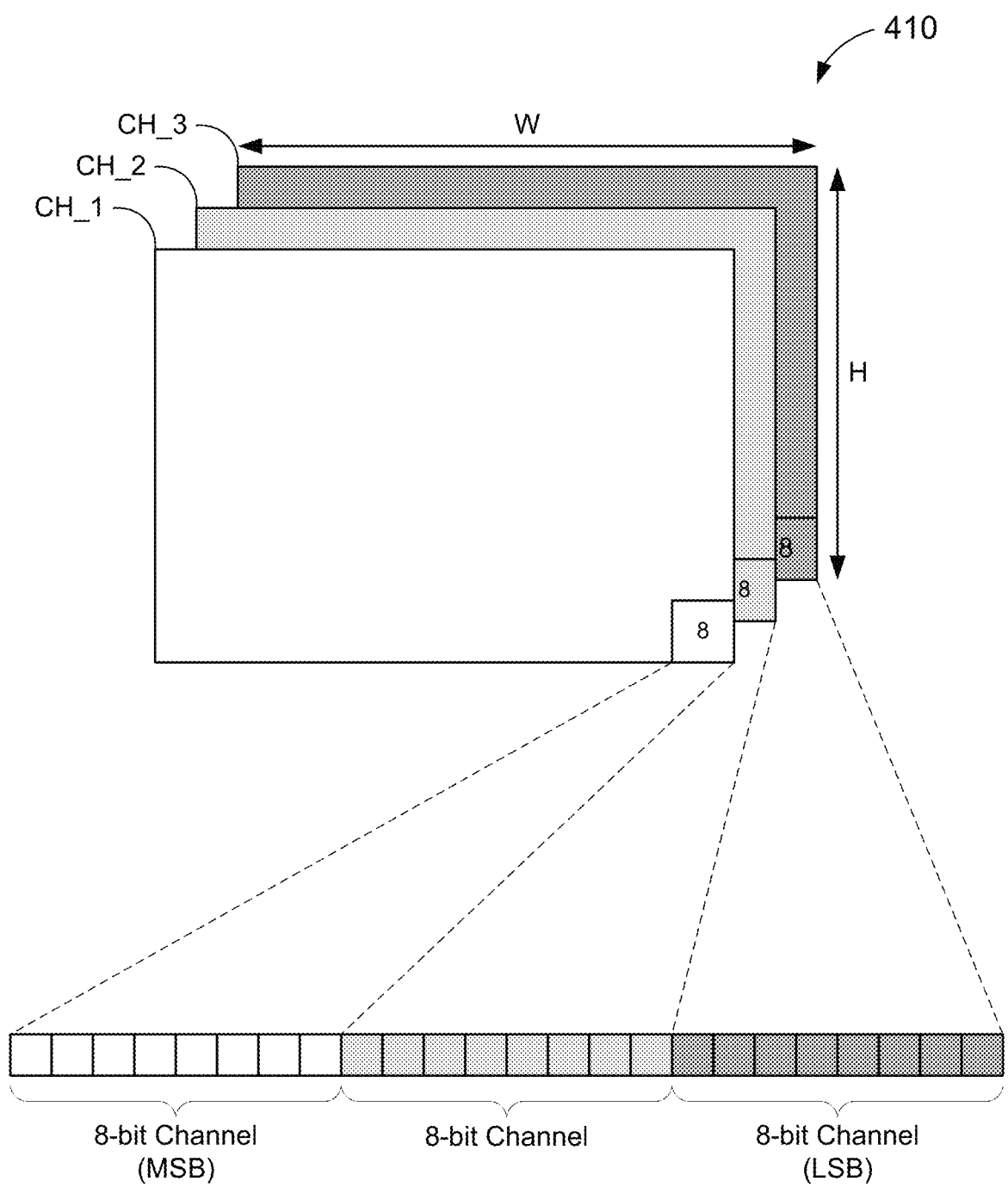
FIG. 4B shows an example input image formed by an array of pixel values partitioned across multiple channels.

FIG. 4B shows an example input image 410 formed by an array of pixel values partitioned across multiple channels. In some implementations, the input image 410 may be one example of the partitioned input image 304 output by the bit partitioning circuit 310. With reference for example to FIG. 4A, the input image 410 may be created by partitioning the input image 400 across three 8-bit channels CH_1-CH_3 (M=3). For example, the bit partitioning circuit 310 may subdivide each 24-bit pixel value of the input image 400 into three 8-bit partitions each coinciding with a respect one of the channels CH_1-CH_3. As shown in FIG. 4B, the first channel CH_1 may carry the MSB of each pixel value associated with the input image 400, the second channel CH_2 may carry the middle 8 bits of each pixel value associated with the input image 400, and the third channel CH_3 may carry the LSB of each pixel value associated with the input image 400. As such, each of the channels CH_1-CH_3 represents an image having the same dimensions (H×W) as the input image 400.

An 8-bit processor (such as the N-bit processor 320 of FIG. 3) may not be able to operate on any of the 24-bit pixel values of the input image 400 (as 24-bit operands) but may be able to operate on each 8-bit partition of the input image 410. More specifically, an AI accelerator may be capable of processing all three 8-bit partitions concurrently or in parallel. Thus, by partitioning the input image 302 across M channels, where each channel includes at most N bits of each pixel value associated with the input image 302, the bit partitioning circuit 310 may recharacterize each pixel value in a manner that can be processed by the N-bit processor 320 without any loss of information or precision. To ensure the accuracy of inferencing results, the same (or similar) types of input data should be used during the training and inferencing phases of machine learning. Thus, in some implementations, the neural network 308 may be trained on input images that are partitioned across multiple channels (such as the partitioned input image 304).

In some aspects, the machine learning system 300 may preserve the resolution and dynamic range of the input image 302 during the inferencing operation. In other words, each pixel value associated with the output image 306 may be represented by the same number (K) of bits as each pixel value associated with the input image 302. In some implementations, the N-bit processor 320 may perform the inferencing operation in a manner that preserves the M channels associated with the partitioned input image 304. As a result, each K-bit pixel value associated with the output image 306 also may be subdivided into M partitions (such as shown in FIG. 4B).

Figure 5:
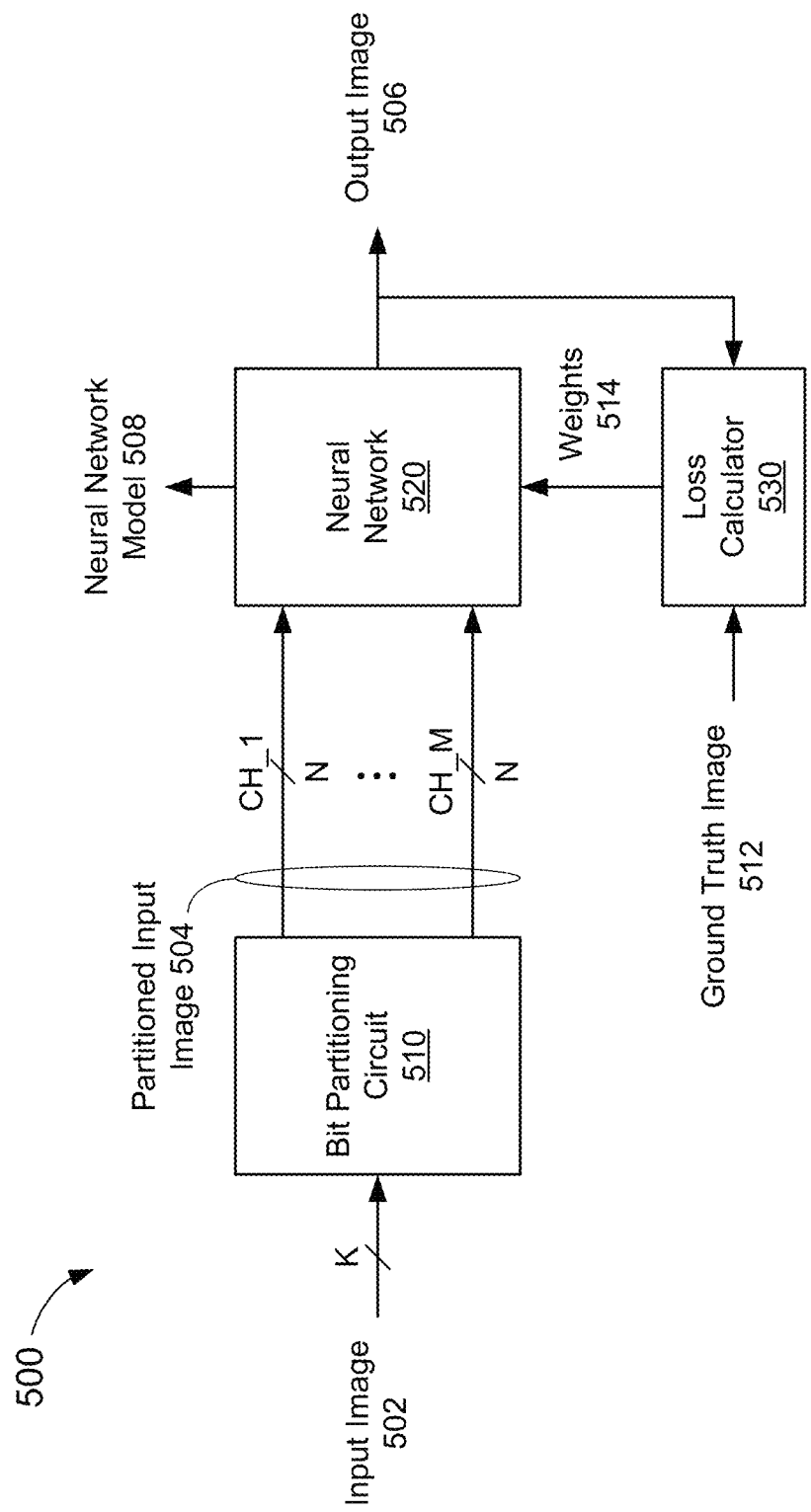
FIG. 5 shows a block diagram of an example machine learning system, according to some implementations.

FIG. 5 shows a block diagram of an example machine learning system 500, according to some implementations. In some implementations, the machine learning system 500 may be configured to train a neural network model 508 based, at least in part, on an input image 502 and a ground truth image 512. In some implementations, the neural network model 508 may be one example of the neural network model 308 of FIG. 3. Thus, the neural network model 508 may represent a set of rules that can be used to infer an output image (such as the output image 306).

The machine learning system 500 includes a bit partitioning circuit 510, a neural network 520, and a loss calculator 530. In some implementations, the machine learning system 500 may train the neural network 520 to reproduce the ground truth image 512 based on one or more input images 502. The ground truth image 512 may be a representative image of a scene under ideal conditions (similar to the output image 206 of FIG. 2). In contrast, each input image 502 may be captured under nonideal conditions (similar to the input image 202 of FIG. 2). In some aspects, the neural network 520 may be implemented by an N-bit processor configured to process N-bit operands. For example, the N-bit processor may include one or more registers, data buses, or ALUs that are configured to store, transfer, or operate on N-bit operands. In some implementations, the neural network 520 may be implemented by an 8-bit processor (N=8).

In some implementations, the bit partitioning circuit 510 may be one example of the bit partitioning circuit 310 of FIG. 3. More specifically, the bit partitioning circuit 510 may perform the same or similar function as the bit partitioning circuit 310. For example, the bit partitioning circuit 510 may be configured to partition the input image 502 across M channels CH_1-CH_M. More specifically, the bit partitioning circuit 510 may subdivide each K-bit pixel value associated with the input image 502 into M partitions, where $$M = \left\lceil \frac{N}{K} \right\rceil,$$

so that each partition coincides with a respective one of the channels CH_1-CH_M. As such, each of the channels CH_1-CH_M may include a respective subset of the bits in each K-bit pixel value associated with the input image 502. For example, the first channel CH_1 may include the MSB of the pixel values and the $M^{th}$ channel CH_M may include the LSB of the pixel values. Thus, the M channels of pixel data collectively represent a partitioned input image 504 (similar to the partitioned input image 304 of FIG. 3).

The neural network 520 receives the partitioned input image 504 and attempts to recreate the ground truth image 512. For example, the neural network 520 may form a network of connections across multiple layers of artificial neurons that begin with the partitioned input image 504 and lead to an output image 506. The connections are weighted (based on a set of weights 514) to result in an output image 506 that closely resembles the ground truth image 512. More specifically, each artificial neuron may receive weighted input data from a previous layer of the neural network 520 and may apply a function or transformation to the weighted input data based on a neural network algorithm. In this manner, the neural network 520 may algorithmically adjust each pixel value of the input image 502 to arrive at the output image 506. In some aspects, the training operation may be performed over multiple iterations. In each iteration, the neural network 520 receives a partitioned input image 504 and produces a respective output image 506 based on the weighted connections across the layers of artificial neurons, and the loss calculator 530 updates the weights 514 associated with the connections based on an amount of loss (or error) between the output image 506 and the ground truth image 512.

In some implementations, the neural network 520 may be trained in the same or similar manner in which the N-bit processor 320 infers the output image 306 based on the partitioned input image 304. For example, the pixel values associated with the partitioned input image 504 may be partitioned to coincide with the M channels CH_1-CH_M (such as described with reference to FIGS. 3-4B). As such, the neural network 520 may be trained to process each partition as a respective unit of input data in producing the output image 506. In some aspects, the neural network 520 may process the M partitions associated with each pixel value in parallel. The neural network 520 may output the weighted connections as the neural network model 508 when certain convergence criteria are met (such as when the loss falls below a threshold level or after a predetermined number of training iterations).

In some aspects, the neural network 520 may preserve the resolution and dynamic range of the input image 502 during the training operation. In other words, each pixel value associated with the output image 506 may be represented by the same number (K) of bits as each pixel value associated with the input image 502. In some implementations, the neural network 520 may perform the inferencing operation in a manner that preserves the M channels associated with the partitioned input image 504. As a result, each K-bit pixel value associated with the output image 506 also may be subdivided into M partitions (such as shown in FIG. 4B).

In the examples of FIGS. 2-5, the bit partitioning techniques (such as performed by the bit partitioning circuits 310 and 510 of FIGS. 3 and 5, respectively) have been described in the context of neural network models that infer an output image based on an input image. In some other implementations, the bit partitioning techniques of the present disclosure may be used in various other neural network applications for which the inference may not be an image (such as object detection, object classification, and facial recognition, among other examples). In other words, the bit partitioning techniques described with reference to FIGS. 2-5 can be used to perform various types of inferencing operations on various types of input data in a lossless manner. Similarly, the bit partitioning techniques described with reference to FIGS. 2-5 can also be used to train a neural network model on various types of input data in a lossless manner.

Figure 6:
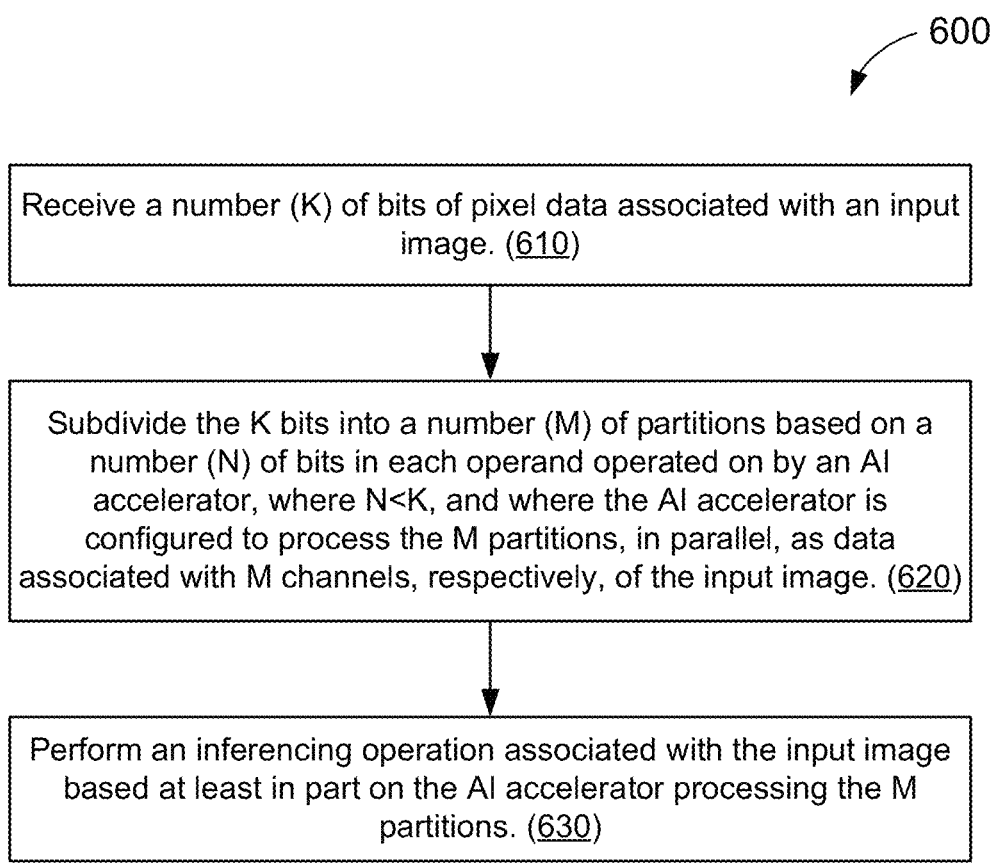
FIG. 6 shows an illustrative flowchart depicting an example inferencing operation, according to some implementations.

FIG. 6 shows an illustrative flowchart depicting an example inferencing operation 600, according to some implementations. In some implementations, the example operation 600 may be performed by a machine learning system such as the machine learning system 300 of FIG. 3. For example, the machine learning system may infer an output image based, at least in part, on an input image. In some aspects, the input image may be an HDR image.

The machine learning system receives a number (K) of bits of pixel data associated with an input image (610). In some implementations, the input image may conform to an HDR image format. As such, the size of each pixel value associated with the input image may be substantially greater than 8 bits. For example, an HDR pixel value may be represented by 12, 16, or 24 bits (K=12, 16, or 24).

The machine learning system subdivides the K bits into a number (M) of partitions based on a number (N) of bits in each operand operated on by an AI accelerator, where N<K, and where the AI accelerator is configured to process the M partitions, in parallel, as data associated with M channels, respectively, of the input image (620). For example, the AI accelerator may be configured to operate on 8-bit operands (N=8). In some implementations, each of the M partitions may include at most N bits of pixel data so that $$M = \left\lceil \frac{N}{K} \right\rceil.$$

In some implementations, the first channel may include the MSB of each pixel value associated with the input image and the $M^{th}$ channel may include the LSB of each pixel value associated with the input image. Because the size of each partition is less than or equal to the operand size of the AI accelerator, and because each partition represents data associated with a respective channel of the input image, the AI accelerator may be able to operate on the M partitions in parallel.

The machine learning system further performs an inferencing operation associated with the input image based at least in part on the AI accelerator processing the M first partitions (630). Example suitable inferencing operations may include, but are not limited to, denoising operations, SR imaging operations, and various other inferencing operations for which a raw unit of input data may be larger than the operand size of the AI accelerator. By subdividing each K-bit pixel value into M partitions, the AI accelerator can process each pixel of an HDR image without loss of information or precision. More specifically, such partitioning allows the AI accelerator to operate on all K bits of each pixel value. As a result, the AI accelerator may perform inferencing operations with greater accuracy and precision than would otherwise be possible with quantized input data.

Figure 7:
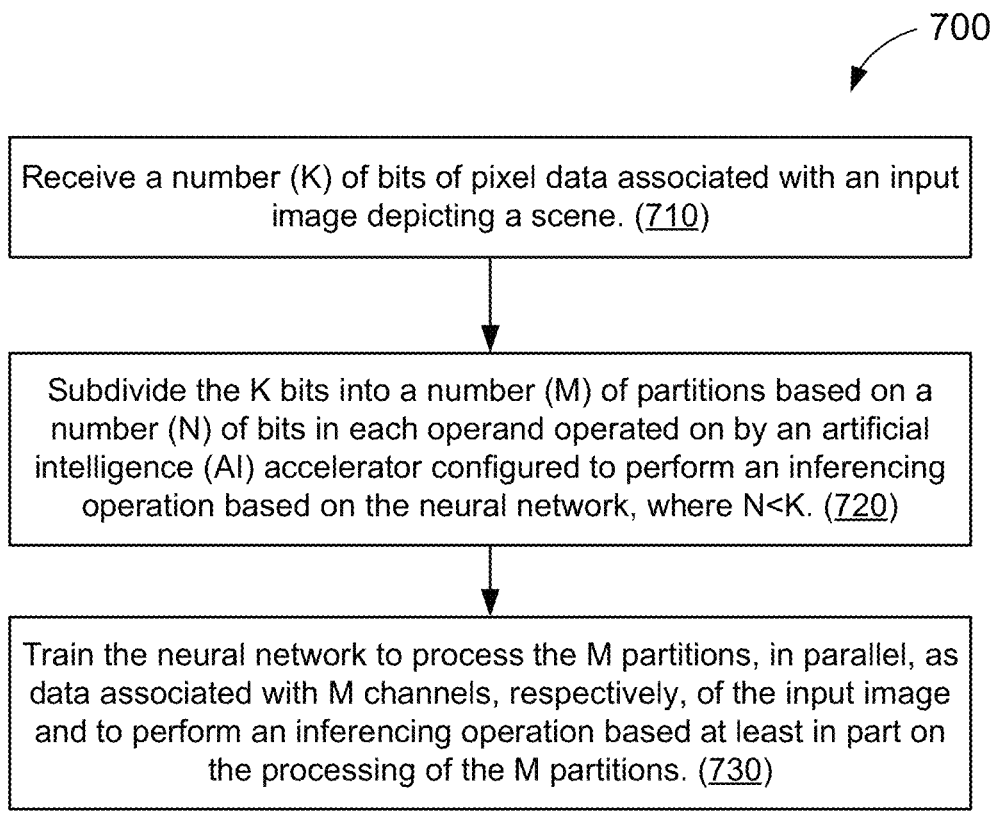
FIG. 7 shows an illustrative flowchart depicting an example operation for training a neural network, according to some implementations.

FIG. 7 shows an illustrative flowchart depicting an example operation 700 for training a neural network, according to some implementations. In some implementations, the example operation 700 may be performed by a machine learning system (such as the machine learning system 500 of FIG. 5) to train a neural network to infer an output image based on an input image.

The machine learning system receives a number (K) of bits of pixel data associated with an input image depicting a scene (710). In some implementations, the input image may conform to an HDR image format. As such, the size of each pixel value associated with the input image may be substantially greater than 8 bits. For example, an HDR pixel value may be represented by 12, 16, or 24 bits (K=12, 16, or 24).

The machine learning system subdivides the K bits into a number (M) of partitions based on a number (N) of bits in each operand operated on by an AI accelerator configured to perform an inferencing operation based on the neural network, where N<K (720). For example, the AI accelerator may be configured to operate on 8-bit operands (N=8). In some implementations, each of the M partitions may include at most N bits of pixel data so that $$M = \left\lceil \frac{N}{K} \right\rceil.$$

In some implementations, the first channel may include the MSB of each pixel value associated with the input image and the $M^{th}$ channel may include the LSB of each pixel value associated with the input image. Because the size of each partition is less than or equal to the operand size of the AI accelerator, and because each partition represents data associated with a respective channel of the input image, the AI accelerator may be able to operate on the M partitions in parallel.

The machine learning system further trains the neural network to process the M partitions, in parallel, as data associated with M channels, respectively, of the input image and to perform an inferencing operation based at least in part on the processing of the M partitions (730). In some implementations, the neural network may be trained to reproduce a representative image (also referred to as a ground truth image) based on the input image. For example, the training operation may be performed over multiple iterations. In each iteration, the neural network receives a partitioned input image and produces a respective output image based on a set of weighted connections across layers of artificial neurons. A loss calculator updates the weights associated with the connections based on an amount of loss (or error) between the ground truth image and the output image produced in each iteration. The neural network may output the weighted connections as a neural network model when certain convergence criteria are met (such as when the loss falls below a threshold level or after a predetermined number of training iterations).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of inferencing by a machine learning system, comprising:
   receiving a number (K) of bits of first pixel data associated with an input image;
   subdividing the K bits into a number (M) of first partitions based on a number (N) of bits in each operand operated on by an artificial intelligence (AI) accelerator, where N<K, the AI accelerator implementing a neural network trained to process the M first partitions, in parallel, as data associated with M channels, respectively, of the input image and to perform an inferencing operation based at least in part on the processing of the M first partitions; and
   performing the inferencing operation on the input image based at least in part on the AI accelerator processing the M first partitions according to the neural network.

2. The method of claim 1, wherein each of the M first partitions includes at most N bits of the first pixel data, where $$M = \left\lceil \frac{N}{K} \right\rceil.$$

3. The method of claim 1, wherein one of the M first partitions includes the N most significant bits of the first pixel data.

4. The method of claim 1, wherein one of the M first partitions includes the N least significant bits of the first pixel data.

5. The method of claim 1, wherein the K bits represent a pixel value associated with the input image.

6. The method of claim 5, wherein the pixel value is a high dynamic range (HDR) value.

7. The method of claim 1, further comprising:
   receiving K bits of second pixel data associated with the input image; and
   subdividing the K bits of second pixel data into M second partitions based on N, the AI accelerator being configured to process the M second partitions, in parallel, as data associated with the M channels, respectively, the inferencing operation further being performed based at least in part on the AI accelerator processing the M second partitions.

8. The method of claim 1, wherein the inferencing operation produces an output image having the same number of bits as the input image.

9. A machine learning system comprising:
   an artificial intelligence (AI) accelerator configured to perform an inferencing operation associated with an input image; and
   bit partitioning circuitry configured to:
      receive a number (K) of bits of first pixel data associated with the input image; and
      subdivide the K bits into a number (M) of partitions based on a number (N) of bits in each operand operated on by the AI accelerator, where N<K;
   wherein the AI accelerator implements a neural network trained to process the M first partitions, in parallel, as data associated with M channels, respectively, of the input image and to perform the inferencing operation based at least in part on the processing of the M first partitions.

10. The machine learning system of claim 9, wherein each of the M first partitions includes at most N bits of the first pixel data, where $$M = \left\lceil \frac{N}{K} \right\rceil.$$

11. The machine learning system of claim 9, wherein the K bits represent a pixel value associated with the input image.

12. The machine learning system of claim 9, wherein the bit partitioning circuitry is further configured to:
   receive K bits of second pixel data associated with the input image; and
   subdivide the K bits of second pixel data into M second partitions based on N, the AI accelerator being configured to process the M second partitions, in parallel, as data associated with the M channels, respectively;
   wherein the inferencing operation is further performed based on the AI accelerator processing the M second partitions.

13. A method of training a neural network, comprising:
   receiving a number (K) of bits of first pixel data associated with an input image depicting a scene;
   subdividing the K bits into a number (M) of first partitions based on a number (N) of bits in each operand operated on by an artificial intelligence (AI) accelerator configured to perform an inferencing operation based on the neural network, where N<K; and
   training the neural network to process the M first partitions, in parallel, as data associated with M channels, respectively, of the input image and to perform an inferencing operation based at least in part on the processing of the M first partitions.

14. The method of claim 13, wherein each of the M first partitions includes at most N bits of the pixel data, wherein $M=\lceil N/K \rceil$.

15. The method of claim 13, wherein one of the M first partitions includes the N most significant bits of the pixel data.

16. The method of claim 13, wherein one of the M first partitions includes the N least significant bits of the pixel data.

17. The method of claim 13, wherein the K bits represent a pixel value associated with the input image.

18. The method of claim 17, wherein the pixel value is a high dynamic range (HDR) value.

19. The method of claim 13, further comprising:
   receiving K bits of second pixel data associated with the input image; and
   subdividing the K bits of second pixel data into M second partitions based on N, the neural network being trained to process the M second partitions, in parallel, as data associated with the M channels, respectively, and to perform the inferencing operation based at least in part on the processing of the M second partitions.

20. The method of claim 13, wherein the training of the neural network comprises:
   receiving a representative image of the scene;
   producing an output image based on the M first partitions, the output image having the same number of bits as the input image; and
   adjusting one or more weights associated with the neural network based on differences between the output image and the representative image.

* * * * *